Dec. 17, 1946.  G. H. RENDEL  2,412,648
AUTOMATIC POSITIONING AND WELDING
Filed July 1, 1944  5 Sheets-Sheet 1

Inventor:
GEORGE H. RENDEL,
by: John E. Jackson
his Attorney.

Dec. 17, 1946.  G. H. RENDEL  2,412,648
AUTOMATIC POSITIONING AND WELDING
Filed July 1, 1944  5 Sheets-Sheet 3

FIG. 3.

Inventor:
GEORGE H. RENDEL,
by: John E. Jackson
his Attorney.

Dec. 17, 1946.　　　　G. H. RENDEL　　　　2,412,648
AUTOMATIC POSITIONING AND WELDING
Filed July 1, 1944　　　　5 Sheets-Sheet 4

Inventor:
GEORGE H. RENDEL,
by: John E. Jackson
his Attorney.

Dec. 17, 1946.  G. H. RENDEL  2,412,648
AUTOMATIC POSITIONING AND WELDING
Filed July 1, 1944  5 Sheets-Sheet 5

FIG. 6.

Inventor:
GEORGE H. RENDEL,
by John E. Jackson
his Attorney.

Patented Dec. 17, 1946

2,412,648

UNITED STATES PATENT OFFICE 2,412,648

AUTOMATIC POSITIONING AND WELDING

George H. Rendel, Mount Lebanon, Pa., assignor to Carnegie-Illinois Steel Corporation, a corporation of New Jersey Application July 1, 1944, Serial No. 543,135

20 Claims. (Cl. 219—4)

This invention relates to automatic positioning and welding apparatus for welding strips end to end in a continuous strip processing line. In continuous strip processing lines such as electrotinning lines, it is necessary to weld or otherwise fasten the trailing end of one coil of strip to the leading end of a succeeding coil of strip. Such tinning lines may be divided into three zones: zone 1 which includes the entering or feeding equipment; zone 2 which includes the various baths, plating and processing units; and zone 3 where the coated strip is sheared, inspected, classified and piled. It is of utmost importance that the equipment of zone 2 be operated in such a manner as to maintain continuous movement of the strip in order to secure uniform pickling and plating.

Slack in the strip must be maintained in zone 1 in order to insure continuous operation through zone 2 when starting a new coil. The over-all time required to position new coils and weld the strips end to end is governed to a great extent by the skill of the operator in manipulating the ends of the strips and the various electrical controls. This manual manipulation and welding usually takes from 26 to 32 seconds, which means that a large amount of slack must be provided in the strip and/or the speed of the line must be reduced greatly, otherwise the slack in the strip will be exhausted before the strips are welded end to end. The storage of such quantities of strip presents problems in design and operation which are difficult to overcome without greatly increasing the initial cost of installation. Reducing the speed to a great extent, decreases both the quality and quantity of the coated strip and should be avoided. With the present invention the time required for manipulation and welding of the strips end to end has been reduced so as not normally to exceed 15 seconds. It will be apparent that this reduction in the time during which the strip in zone 1 is not being fed to zone 2 requires less reduction in speed of the strip in zone 2 during welding of the strips end to end.

It is an object of my invention to provide automatic means for performing a majority of the operations in zone 1 so as to reduce the amount of time necessary for welding the strips end to end.

Another object is to provide apparatus which will automatically position the end of a strip and indicate the position of the strip as it passes into welding position.

These and other objects will be more apparent after referring to the following specification and attached drawings, in which.

Figure 2:
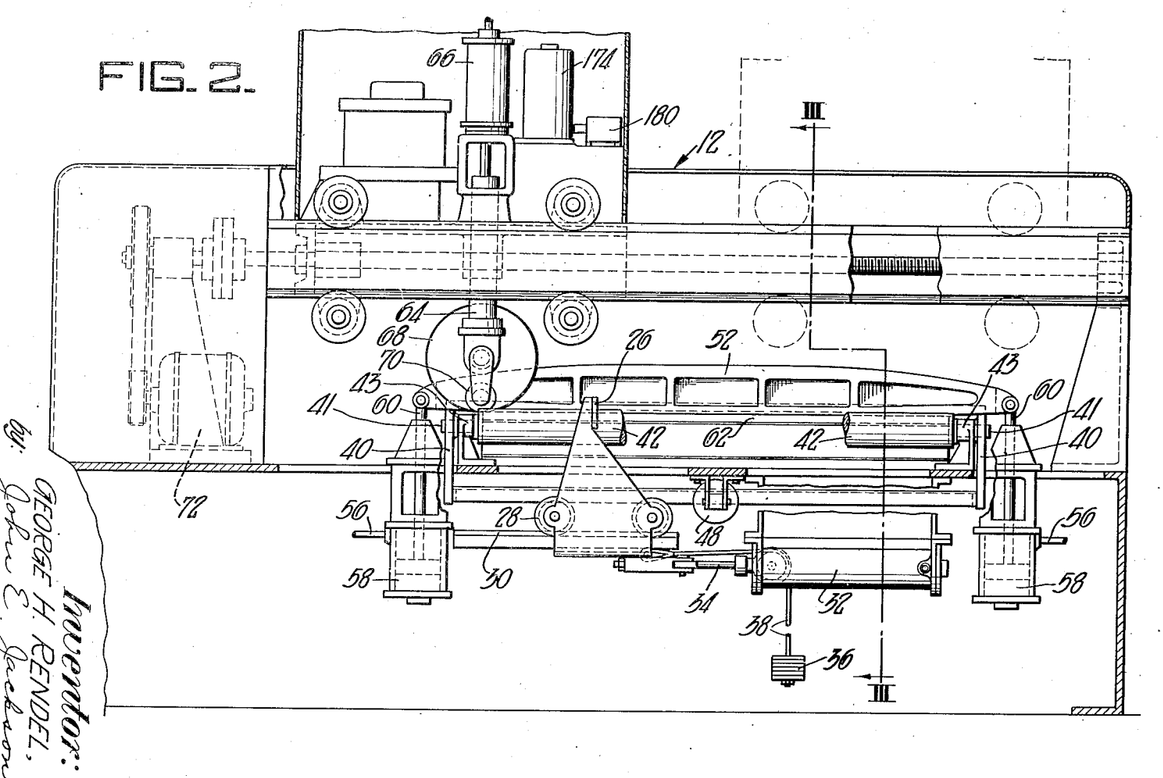
Figure 2 is a view showing the welding and clamping apparatus.
Figure 3:
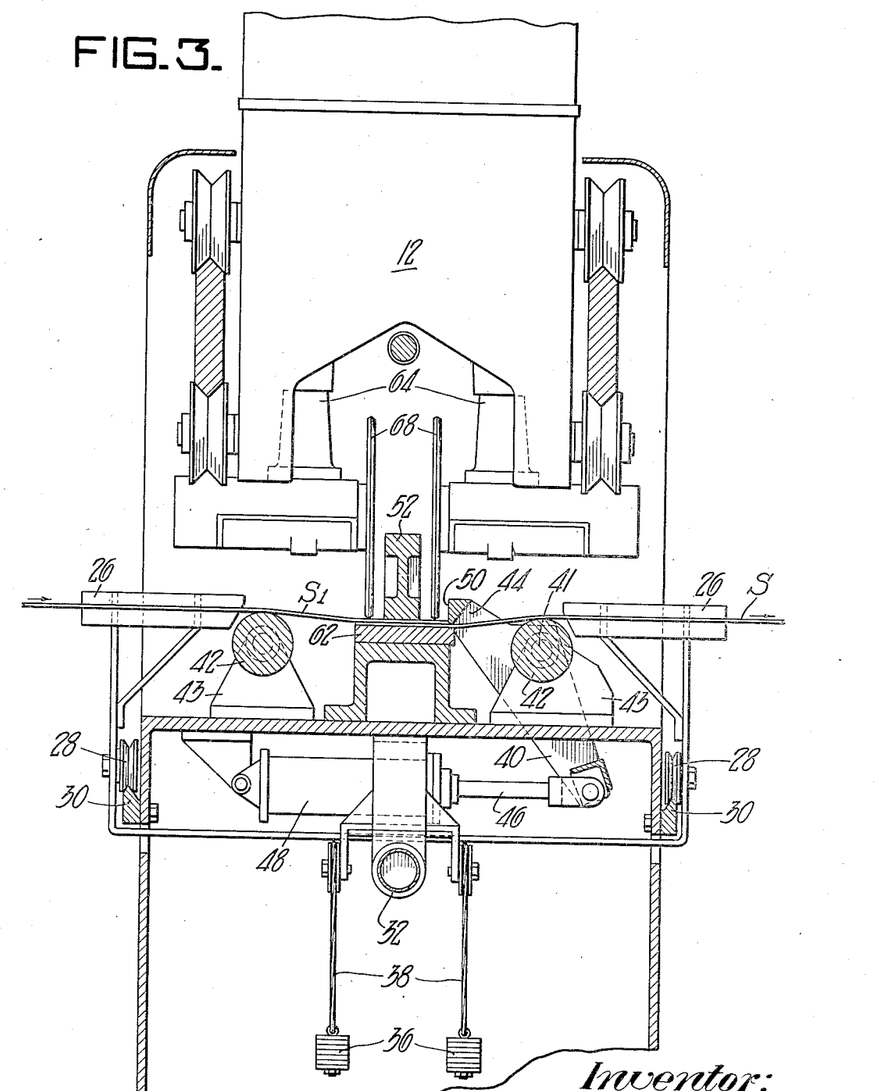
Figure 3 is a view taken on the line III—III of Figure 2.

Referring more particularly to the drawings, reference numeral 2 indicates a coil holder for supporting a coil of strip S which is being continuously electrotinned or otherwise processed. The strip S passes from the coil holder 2 to a shear 4 which is provided with pinch rolls 6 and a movable lower shear blade 8 which cooperates with an intermediate shear blade 10 to trim the leading and trailing edges of coils of strip being unwound from the coil holder 2. From here the strip passes through the welder 12 to pinch rolls 14, which feed the strip to the looper pit 16. A second coil holder 18 is mounted adjacent the coil holder 2 and supports a coil of strip S—1 which is to be attached to the trailing edge of strip S. While the strip S is passing through the line, the strip S—1 is mounted in coil holder 18 and passed through pinch rolls 20 and its leading edge is trimmed between the upper movable shear blade 22 and the intermediate shear blade 10. The leading edge of the strip is then suspended against the top magnet 24 adjacent the welder in readiness for quick handling during positioning. When the strip S is entirely unwound, its trailing edge is cut off between the shear blades 8 and 10 and the strip is moved into the desired position for welding by means of the pinch rolls 14. As best shown in Figure 2, the welder 12 is provided with edge guides 26 for the strip being processed. Each of the guides is mounted on wheels 28 and is moved on a track 30 by means of a cylinder 32 which is attached to the guide by means of piston rod 34. The weights 36, attached to the guide 26 by means of the cable 38, draw the guide toward the edge of the moving strip when air is exhausted from the cylinder 32. As the strip S passes through the welder 12 it is stopped in the desired position by means of the pinch rolls 14. On the exit side of the welder 12 is a stop bar 40, which is pivotally mounted on the pins 41 which are attached to the ends of the idler roll 42 and supported in bearings 43. The stop bar 40 has a hollow portion 44 to permit passage of the strip. The stop bar 40 is attached to piston rod 46 and is actuated by movement of the piston in cylinder 48. When the strip S has reached the desired position, the stop bar 40 holds it in that position as shown in Figure 3. It will be seen that the stop bar is provided with a surface 50 against which the leading edge of the strip S—1 abuts. When the strip S is positioned as shown, the magnet 24 is deenergized and the strip S—1 placed with its leading edge against the surface 50 and the clamp 52 is lowered by opening valve 54 to admit fluid through pipe 56 to the top of cylinders 58, the clamp 52 being attached to piston rods 60. After the strips S and S—1 are clamped between clamp 52 and the bottom electrode 62, the welding head 64 is lowered by admitting air to the top of cylinder 66. The welding head 64 carries circular electrodes 68 and a contact wheel 70. The head traverse motor 72 moves the welding head 64 toward the strip until the wheel 70 contacts the strip. Meanwhile, power is applied to the electrodes 68 and the forward movement of the welding head carrying the rotating electrodes continues until the two strips are welded together. When the welding is completed, all of the parts return to their normal position.

Figure 4:
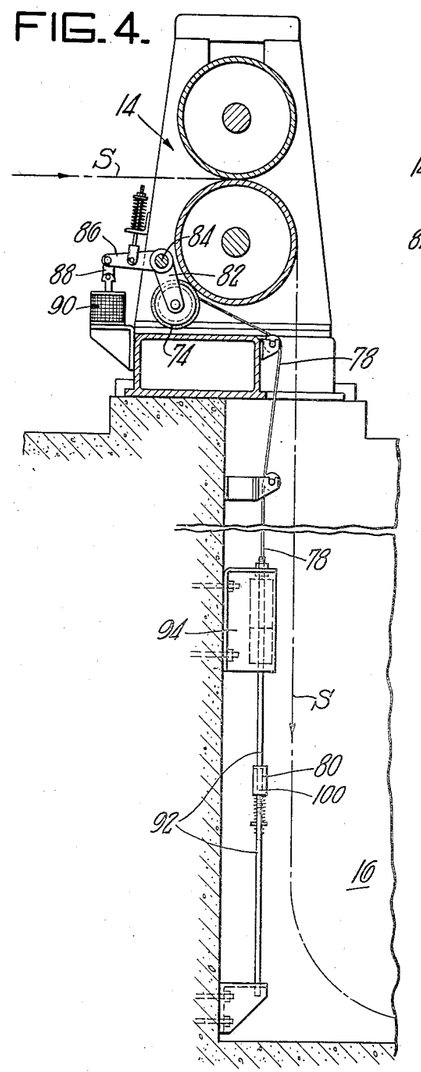
Figure 4 is an elevation showing the apparatus for indicating the position of the strip.
Figure 5:
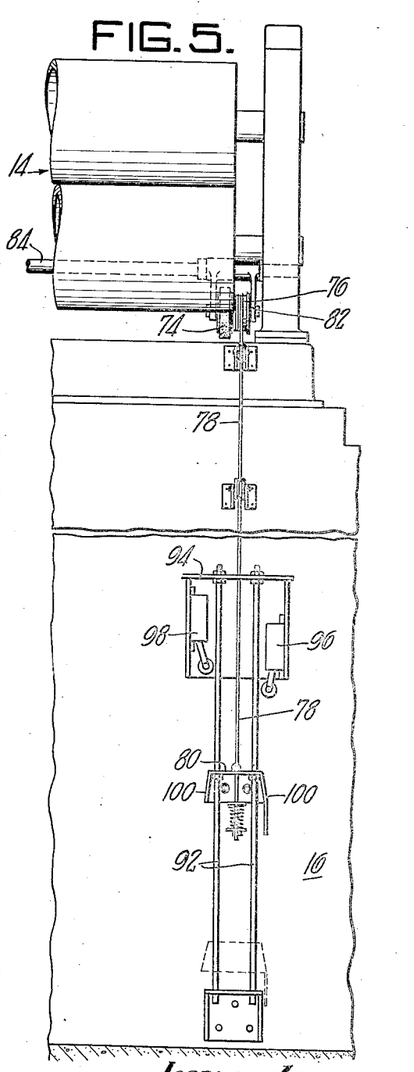
Figure 5 is an end view of Figure 4.

In order to accurately position the trailing edge of the strip S there is mounted adjacent the pinch rolls 14, a wheel 74 which has a cable drum 76 connected thereto for rotation therewith. A cable 78 is wound on the drum 76 and has fastened to its lower end in any suitable manner a weight 80. The wheel 74 is carried on an arm 82 which is pivotally mounted for movement with a shaft 84. An arm 86 is rigidly mounted on the shaft 84 and is connected by means of a link 88 to the solenoid 90. When the pinch rolls 14 are started in order to position the end of the strip S, the wheel 74 is swung into engagement with the pinch rolls 14 by means of the solenoid 90, this causing the weight 80 to move upwardly in the guides 92. Supported on the guide bracket 94 are two limit switches 96 and 98 which are adapted to be actuated by contact with the beveled sides 100 of the weight 80. The position of the weight 80 indicates the relative position of the strip S.

Figure 1:
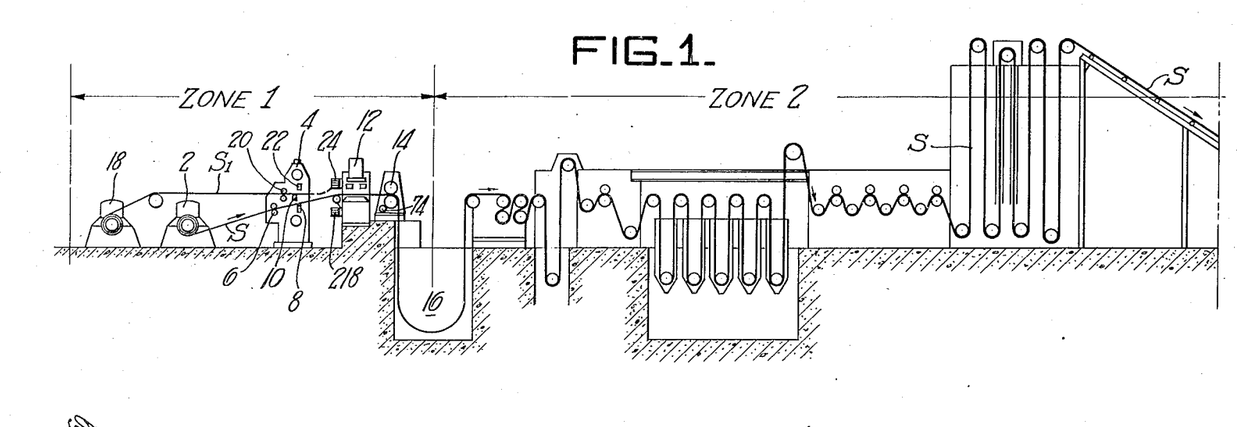
Figures 1 and 1A combined show an electrotinning line with which my invention is associated.
Figure 1A:
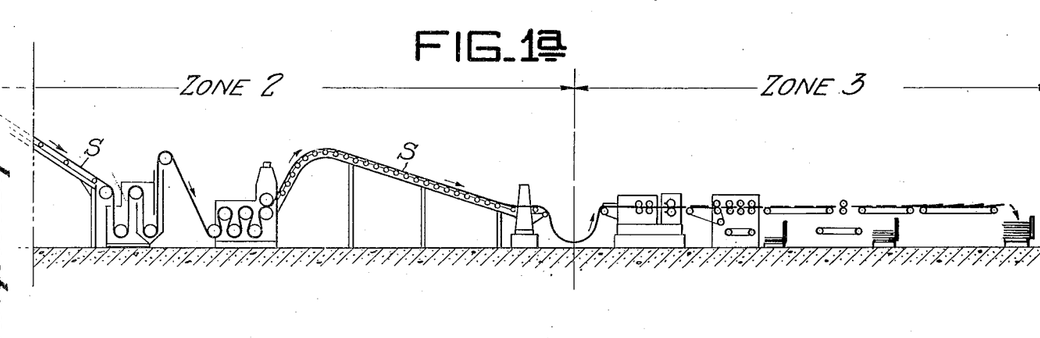
Figure 6:
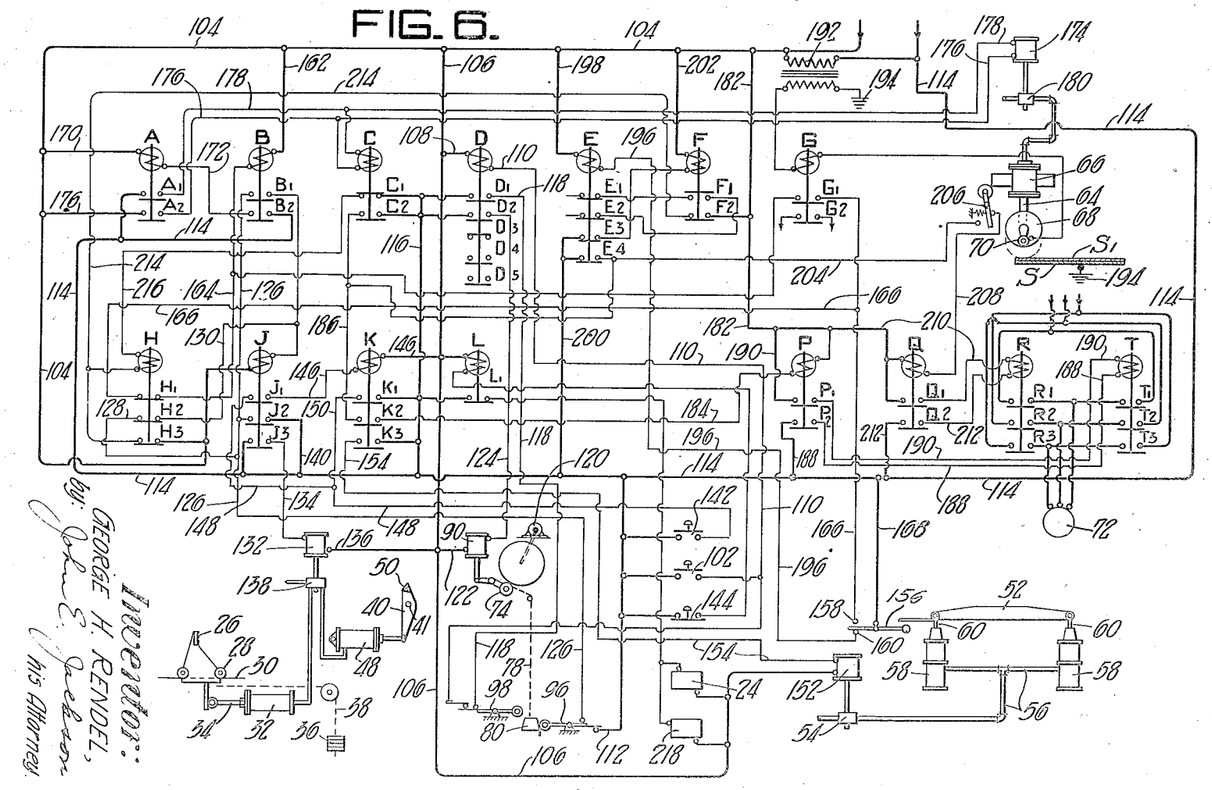
Figure 6 shows a schematic wiring diagram for automatically positioning and welding the strips end to end.

The operation of the device is as follows:

When it is desired to weld the trailing end of strip S to the leading edge of strip S—1, the end of the strip S—1 is trimmed and held in position by means of electromagnet 24 as previously described and in the position shown in Figure 1. The entire line is then slowed down by means of equipment which is not a part of this invention. In most cases it is necessary to run at this reduced speed in order to provide sufficient time for positioning and welding the strips together. The pinch rolls 14 and uncoiler 2 are then stopped, the accumulated strip in looper pit 16 being fed into zones 2 and 3 to keep the processing portion of the line operating. The trailing end of strip S is then cut off between the shear blades 8 and 10. At this time the various parts of the machine and the electric circuit are in the positions shown in Figure 1. The trailing edge of the strip S is then positioned as follows:

The push button 102 is depressed, this closing the circuit to positioning relay D through lines 104, 106, 108, relay D, line 110, push button switch 102, line 112 and line 114. The relay D is momentarily energized closing contacts D—1 and sealing in the circuit to relay D through lines 114, 116, 118, limit switch 98, line 110, relay D, lines 108, 106 and 104. Contact D—3 is opened and contacts D—4 and D—5 are closed, this closing a separate power circuit (not shown) which starts the pinch roll motor 120 and the sheared end of the strip S is drawn forwardly through the welder by means of the pinch rolls 14. The closing of contact D—2 completes the circuit to the strip positioning solenoid 90 through lines 104, 106, 122, 124, 116 and 114. This swings the wheel 74 into frictional contact with revolving pinch roll 14 and as the wheel 74 rotates, the cable drum 76 winds up cable 78 to which is attached the weight 80. The position of the moving weight 80 indicates the position of the sheared end of the strip S being drawn through the pinch rolls 14. When the ascending weight strikes the limit switch 96, it closes its normally open contacts, which completes the circuit to stop bar relay J through lines 114, 112, 126, 128, closed contact H—2, lines 130 and 104. The closing of contact J—3 completes the circuit to solenoid 132 through lines 114, 134, 136, 106 and 104. Energization of solenoid 132 operates valve 138, which admits compressed air to stop bar cylinder 48 and exhausts air from guide cylinder 32. When air is admitted to cylinder 48 the stop bar 40 descends toward the strip which is still moving. When air is exhausted from cylinder 32, the weight 36 draws the guides 26 toward the edge of the moving strip. During this time interval, in which the cylinders are in operation, weight 80 continues ascending until it finally strikes limit switch 98 to open its normally closed contacts and break the circuit to relay D whose associated contact D—3 will close and contacts D—4 and D—5 will open instantly to stop the pinch rolls 14. The opening of contact D—1 removes the seal imposed on the circuit to relay D and the opening of contact D—2 deenergizes solenoid 90, causing the wheel 74 to be retracted from contact with the pinch roll 14. The weight 80 immediately descends to starting position. The devices and circuits thus described are synchronized so as to cause stop bar 40 and guides 26 to arrive at their respective locations with respect to the strip simultaneously with the stopping of rolls 14. The sheared end of strip S is now held firmly in position in the welder 12 by stop bar 40 which is located a sufficient distance from the end of the strip to provide enough lap for proper welding. Movement of the guide 26 is stopped since the guide has contacted the edge of the strip S. Both guide and stop bar remain in their operative position until completion of the welding operation, since relay J is still energized. The closing of contact J—2 seals the circuit to relay J around the normally open contacts in switch 96, through lines 114, 140, 126, 128, 130 and 104. The closing of contact J—1 sets up a circuit to clamp push button 142, which is used to start the welding operation described below.

The operator then steps on push button switch 144, which deenergizes the magnet 24, by momentarily breaking the circuit to normally energized relay L. The operator now inserts the end of the strip S—1 into the welder against surface 50 of the stop bar 40 where it assumes a position in lapped relationship to strip S with the edges of both strips evenly matched. The push button switch 142 is then closed to complete a circuit to relay K through lines 104, 106, 146, closed contact J—1, lines 148, 112 and 114. The closing of contact K—1 seals the circuit to relay K through lines 114, 116, 150, 148, closed contact J—1, lines 146, 106 and 104. The closing of contact K—2 sets up a circuit between contact C—2 and relay P for forward travel of the motor driven welding head. The closing of contact K—3 completes the circuit to solenoid 152, through lines 104, 106, 154, 116 and 114. Energization of solenoid 152 operates an air valve 54 to admit air to clamp cylinders 58 which lower clamp 52 against the two strip ends positioned in the welder. As clamp 52 descends, it strikes limit switch 156, closing contact 158 and opening contact 160. Closing of contact 158 completes the circuit to relay B through lines 104, 162, 164, normally closed contact H—1, lines 166, 168 and 114. The closing of contact B—1 seals the circuit to relay J around contact H—2. The closing of contact B—2 closes the circuit to relay A through lines 104, 170, 172 and 114, this closing contacts A—1 and A—2, which completes a circuit to relay C and solenoid 174, through lines 104, 176, 178 and 114. Solenoid 174 operates an air valve 180 to admit air to a cylinder 66, which lowers welding head 64 to which is attached the circular electrodes 68 and contact wheel 70. The opening of contact 160 breaks the circuit to normally energized relay E, which becomes deenergized with all of its contacts opening. The opening of contacts E—1 and E—2 breaks the power circuit (not shown) to the pinch roll motor 120 and the uncoilers 2 and 18 rendering them inoperative during the welding operation. The opening of contact E—3 deenergizes normally energized relay F and the opening of contact E—4 prevents operation of the welding head motor 72 in reverse direction. Energization of relay C, described above, opens normally closed contact C—1, but the opening is delayed long enough to provide sufficient time for wheel 70 to contact the strip after the welding head forward travel is started. The closing of contact C—2 completes a circuit to relay P through lines 104, 182, 184, closed contact K—2, lines 186, 116 and 114.

The closing of contacts P—1 and P—2 completes the circuit to relay T through lines 114, 188, 190, 182 and 104. This closes contacts T—1, T—2 and T—3 to apply power to the head traverse motor 72, which drives the welding head 64 toward the strip. When the head travels far enough, wheel 70 contacts the strip and completes the circuit to relay G through the primary winding of a 24 volt transformer 192 to ground 194. The closing of contact G—1 insures energization of relay B until contact 158 of limit switch 156 is opened when clamp 52 is raised. The closing of contact G—2 closes an internal electrode firing circuit (not shown) in the welder and power is applied to the electrodes 68. As the head 64 continues its forward travel across the entire width of the clamped together strips, they are welded together by the rotating electrodes 68.

When welding has been completed and wheel 70 breaks contact with the strip, all the various parts are returned to normal position as follows. Relay G is deenergized, this deenergizing relay B and breaking the power circuit to the electrodes 68. Deenergization of relay B deenergizes relays A and J. The deenergization of relay J opens the circuit to solenoid 132 and actuates valve 138 to admit air to cylinders 32 and 40 reversing their action and causing the guides 26 and stop bar 40 to return to their normal positions. Deenergization of relay A deenergizes solenoid 174 and timing relay C. Solenoid 174 operates cylinder 66 in the reverse direction, raising welding head 64. Deenergization of relay K removes the seal around push button 142, deenergizes relay P and clamp solenoid 152. Solenoid 152 operates valve 54 to admit air to cylinders 58, raising clamp 52. Opening of contacts P—1 and P—2 deenergizes relay T to stop forward travel of the welding head 64. When clamp 52 is raised it actuates limit switch 156 to close contact 160, this completing a circuit to relay E through lines 114, 168, 196, 198 and 104. Closing of contacts E—1 and E—2 permits operation of uncoilers 2 and 18 and pinch rolls 14. Closing of contact E—3 completes the circuit to relay F through lines 114, 200, 202 and 104. Closing of contact E—4 completes a circuit to relay Q through lines 114, 200, 204, limit switch 206, lines 208, 210, 182 and 104. When relay Q is energized, its contacts Q—1 and Q—2 complete the circuit to reversing relay R through lines 104, 182, 210, 212 and 114. Energization of relay R closes the contacts R—1, R—2 and R—3 to apply power to the welding head traverse motor which starts reverse travel of the welding head 64. This is interrupted when the head strikes limit switch 206, opening its contacts, thus deenergizing relay Q, which in turn deenergizes relay R and stops the traverse motor 72.

As mentioned above, relay F is now energized and its contact F—2 will complete a circuit to relay H through lines 104, 182, 214, 216, 116 and 114. Opening of contact F—1 is delayed long enough to permit relays in the power circuit (not shown) to function to restart equipment in zone 1. At this point, the entire line will now be operating at a reduced speed. To increase the operating speed to normal, the operator operates controls that are provided for this purpose, but are not a part of this invention.

When it is desired to weld a strip to the end of strip S—1, a coil of strip is placed in the uncoiler 2 and its leading edge is trimmed between shear blades 6 and 10 and the end held by magnet 218. The operation described above is then repeated with strip S—1 being the leading strip and the strip supported on uncoiler 2 being the trailing strip.

While one embodiment of the invention has been shown and described, it will be apparent that other adaptations and modifications may be made without departing from the scope of the following claims.

I claim:

1. Strip positioning apparatus for strip processing lines comprising a rotatable roll for drawing the strip through the line, means for rotating said roll, means for actuating said rotating means, a wheel adapted to be swung into contact with said roll by said actuating means, a cable drum mounted for rotation with said wheel, a cable wound on said drum, a weight on the lower end of said cable, the position of said weight indicating the relative position of said strip, and means actuated by said weight for stopping the rotation of said roll when the strip has reached the desired position.

2. Strip positioning apparatus for strip processing lines comprising a rotatable roll for drawing the strip through the line, means for rotating said roll, means for actuating said rotating means, a wheel adapted to be swung into contact with said roll by said actuating means, a cable drum mounted for rotation with said wheel, a cable wound on said drum, a weight on the lower end of said cable, the position of said weight indicating the relative position of said strip, a movable stop bar for holding the strip in its desired position, and means actuated by said weight for moving said stop bar to its operative position and stopping the rotation of said roll when the strip has reached its desired position.

3. Strip positioning apparatus for strip processing lines comprising a rotatable roll for drawing the strip through the line, means for rotating said roll, means for actuating said rotating means, a wheel adapted to be swung into contact with said roll by said actuating means, a cable drum mounted for rotation with said wheel, a cable wound on said drum, a weight on the lower end of said cable, the position of said weight indicating the relative position of said strip, a movable stop bar for holding the strip in its desired position, means actuated by said weight for moving said stop bar toward its operative position, and means actuated by continued movement of said weight to stop the rotation of said roll and move said wheel out of contact therewith when the strip has reached its desired position.

4. Strip positioning apparatus for strip processing lines comprising a rotatable roll for drawing the strip through the line, means for rotating said roll, means for actuating said rotating means, a wheel adapted to be swung into contact with said roll by said actuating means, a cable drum mounted for rotation with said wheel, a cable wound on said drum, a weight on the lower end of said cable, the position of said weight indicating the relative position of said strip, a limit switch, a movable stop bar for holding the strip in its desired position, said switch being actuated by said weight to actuate said stop bar toward operative position, a second limit switch actuated by said weight on continued movement thereof to stop the rotation of said roll and to move said wheel out of contact therewith.

5. Strip positioning apparatus for strip processing lines comprising a rotatable roll for drawing the strip through the line, means for rotating said roll, means for actuating said rotating means, a wheel adapted to be swung into contact with said roll by said actuating means, a cable drum mounted for rotation with said wheel, a cable wound on said drum, a weight on the lower end of said cable, the position of said weight indicating the relative position of said strip, a limit switch, a movable stop bar for holding the strip in its desired position, movable edge guides for said strip, said switch being actuated by said weight to move said stop bar and guides toward operative position, a second limit switch actuated by said weight on continued movement thereof to stop the rotation of said roll and to move said wheel out of contact therewith when the strip has reached its desired position.

6. Strip positioning apparatus for strip processing lines comprising a rotatable roll for drawing the strip through the line, means for rotating said roll, means for actuating said rotating means, means operable by the actuating means to indicate the position of said strip, a movable stop bar for holding the strip in its desired position, and means actuated by said indicating means for moving said stop bar to its operative position and stopping the rotation of said roll when the strip has reached its desired position.

7. Apparatus for welding strips end to end in continuous strip processing lines comprising a movable welding head, an electrode mounted on said welding head, means for moving the electrode into contact with said strips and for supplying power to the electrode, means responsive to the completion of the welding operation to open the power circuit and raise the welding head, means to reverse the movement of the welding head, and a limit switch actuated by the welding head on reverse movement thereof to stop its movement.

8. Apparatus for welding strips end to end in continuous strip processing lines comprising a clamp for holding the strips in position to be welded, means for moving the clamp into operative position, a movable welding head, an electrode mounted on said welding head, means actuated by movement of said clamp into operative position to move the electrode into contact with said strips and to supply power to the electrode, means to open the power circuit and to raise the clamp and welding head, automatic means for reversing the movement of the welding head upon completion of the welding operation, and a limit switch actuated by the welding head on reverse movement thereof to stop its movement.

9. Apparatus for welding strips end to end in continuous strip processing lines comprising a clamp for holding the strips in position to be welded, means for moving the clamp into operative position, a movable welding head, an electrode mounted on said welding head, means actuated by movement of said clamp into operative position to move the electrode into contact with said strips and to supply power to the electrode, means to open the power circuit and to raise the clamp and welding head, means actuated by upward movement of the clamp to reverse the movement of the welding head, and a limit switch actuated by the welding head on reverse movement thereof to stop its movement.

10. Apparatus for welding strips end to end in continuous strip processing lines comprising a clamp for holding the strips in position to be welded, means for moving the clamp into operative position, a movable welding head, an electrode mounted on said welding head, means actuated by movement of said clamp into operative position to move the electrode into contact with said strips and to supply power to the electrode, means responsive to the completion of the welding operation to open the power circuit and to raise the clamp and welding head, means actuated by upward movement of the clamp to reverse the movement of the welding head, and a limit switch actuated by the welding head on reverse movement thereof to stop its movement.

11. Apparatus for positioning and welding strips end to end in a continuous strip processing line comprising a rotatable roll for drawing the leading strip through the line, means for rotating said roll, means for actuating said rotating means, means operable by the actuating means to indicate the position of said strip, a movable stop bar for holding the strip in the welding position, means actuated by said indicating means for moving said stop bar to its operative position and stopping the rotation of said roll when the strip has reached the welding position, manually operable means for positioning the leading edge of the trailing strip against the stop bar in welding position, and means for welding the strips end to end.

12. Apparatus for positioning and welding strips end to end in a continuous strip processing line comprising a rotatable roll for drawing the leading strip through the line, means for rotating said roll, means for actuating said rotating means, means operable by the actuating means to indicate the position of said strip, a movable stop bar for holding the strip in the welding position, means actuated by said indicating means for moving said stop bar to its operative position and stopping the rotation of said roll when the strip has reached the welding position, manually operable means for positioning the leading edge of the trailing strip against the stop bar in welding position, a clamp for holding the strips in position to be welded, means for moving the clamp into operative position, a movable welding head, an electrode mounted on said welding head, means actuated by movement of said clamp into operative position to move the electrode into contact with said strips and supply power to the electrode, means to open the power circuit and raise the clamp and welding head, automatic means for reversing the movement of the welding head upon completion of the welding operation, and a limit switch actuated by the welding head on reverse movement thereof to stop its movement.

13. Apparatus for positioning and welding strips end to end in a continuous strip processing line comprising a rotatable roll for drawing the leading strip through the line, means for rotating said roll, means for actuating said rotating means, a wheel adapted to be swung into contact with said roll by said actuating means, a cable drum mounted for rotation with said wheel, a cable wound on said drum, a weight on the lower end of said cable, the position of said weight indicating the relative position of said strip, means actuated by said weight for stopping the rotation of said roll when the strip has reached the welding position, manually operable means for positioning the leading edge of the trailing strip on the trailing edge of the leading strip in welding position, and means for welding the strips end to end.

14. Apparatus for positioning and welding strips end to end in a continuous strip processing line comprising a rotatable roll for drawing the leading strip through the line, means for rotating said roll, means for actuating said rotating means, a wheel adapted to be swung into contact with said roll by said actuating means, a cable drum mounted for rotation with said wheel, a cable wound on said drum, a weight on the lower end of said cable, the position of said weight indicating the relative position of said strip, means actuated by said weight for stopping the rotation of said roll when the strip has reached the welding position, manually operable means for positioning the leading edge of the trailing strip on the trailing edge of the leading strip in welding position, a clamp for holding the strips in position to be welded, means for moving the clamp into operative position, a movable welding head, an electrode mounted on said welding head, means actuated by movement of said clamp into operative position to move the electrode into contact with said strips and supply power to the electrode, means to open the power circuit and raise the clamp and welding head, automatic means for reversing the movement of the welding head upon completion of the welding operation, and a limit switch actuated by the welding head on reverse movement thereof to stop its movement.

15. Apparatus for positioning and welding strip end to end in a continuous strip processing line comprising a rotatable roll for drawing the leading strip through the line, means for rotating said roll, means for actuating said rotating means, a wheel adapted to be swung into contact with said roll by said actuating means, a cable drum mounted for rotation with said wheel, a cable wound on said drum, a weight on the lower end of said cable, the position of said weight indicating the relative position of said strip, a movable stop bar for holding the strip in the welding position, means actuated by said weight for moving said stop bar to its operative position and stopping the rotation of said roll when the strip has reached the welding position, manually operable means for positioning the leading edge of the trailing strip against the stop bar in welding position, and means for welding the strips end to end.

16. Apparatus for positioning and welding strip end to end in a continuous strip processing line comprising a rotatable roll for drawing the leading strip through the line, means for rotating said roll, means for actuating said rotating means, a wheel adapted to be swung into contact with said roll by said actuating means, a cable drum mounted for rotation with said wheel, a cable wound on said drum, a weight on the lower end of said cable, the position of said weight indicating the relative position of said strip, a movable stop bar for holding the strip in the welding position, means actuated by said weight for moving said stop bar to its operative position and stopping the rotation of said roll when the strip has reached the welding position, manually operable means for positioning the leading edge of the trailing strip against the stop bar in welding position, a clamp for holding the strips in position to be welded, means for moving the clamp into operative position, a movable welding head, an electrode mounted on said welding head, means actuated by movement of said clamp into operative position to move the electrode into contact with said strips and supply power to the electrode, means to open the power circuit and raise the clamp and welding head, automatic means for reversing the movement of the welding head upon completion of the welding operation, and a limit switch actuated by the welding head on reverse movement thereof to stop its movement.

17. Apparatus for positioning and welding strips end to end in a continuous strip processing line comprising a rotatable roll for drawing the leading strip through the line, means for rotating said roll, means for actuating said rotating means, means operable by the actuating means to indicate the position of said strip, a movable stop bar for holding the strip in the welding position, means actuated by said indicating means for moving said stop bar to its operative position and stopping the rotation of said roll when the strip has reached the welding position, manually operable means for positioning the leading edge of the trailing strip against the stop bar in welding position, a movable welding head, an electrode mounted on said welding head, means for moving the electrode into contact with said strips and for supplying power to the electrode, means responsive to the completion of the welding operation to open the power circuit, to return the stop bar to its inoperative position and raise the welding head, means to reverse the movement of the welding head, and a limit switch actuated by the welding head on reverse movement thereof to stop its movement and to rotate said rotatable roll.

18. Apparatus for positioning and welding strips end to end in a continuous strip processing line comprising a rotatable roll for drawing the leading strip through the line, means for rotating said roll, means for actuating said rotating means, a wheel adapted to be swung into contact with said roll by said actuating means, a cable drum mounted for rotation with said wheel, a cable wound on said drum, a weight on the lower end of said cable, the position of said weight indicating the relative position of said strip, means actuated by said weight for stopping the rotation of said roll when the strip has reached the welding position, manually operable means for positioning the leading edge of the trailing strip on the trailing edge of the leading strip in welding position, a movable welding head, an electrode mounted on said welding head, means for moving the electrode into contact with said strips and for supplying power to the electrode, means responsive to the completion of the welding operation to open the power circuit and raise the welding head, means to reverse the movement of the welding head, and a limit switch actuated by the welding head on reverse movement thereof to stop its movement and to rotate said rotatable roll.

19. Apparatus for positioning and welding strip end to end in a continuous strip processing line comprising a rotatable roll for drawing the leading strip through the line, means for rotating said roll, means for actuating said rotating means, a wheel adapted to be swung into contact with said roll by said actuating means, a cable drum mounted for rotation with said wheel, a cable wound on said drum, a weight on the lower end of said cable, the position of said weight indicating the relative position of said strip, a movable stop bar for holding the strip in the welding position, means actuated by said weight for moving said stop bar to its operative position and stopping the rotation of said roll when the strip has reached the welding position, manually operable means for positioning the leading edge of the trailing strip against the stop bar in welding position, a movable welding head, an electrode mounted on said welding head, means for moving the electrode into contact with said strips and for supplying power to the electrode, means responsive to the completion of the welding operation to open the power circuit, to return the stop bar to its inoperative position and raise the welding head, means to reverse the movement of the welding head, and a limit switch actuated by the welding head on reverse movement thereof to stop its movement and to rotate said rotatable roll.

20. Apparatus for positioning and welding strips end to end in a continuous strip processing line comprising a rotatable roll for drawing the strip through the line, means for rotating said roll, means for actuating said rotating means, a wheel adapted to be swung into contact with said roll by said actuating means, a cable drum mounted for rotation with said wheel, a cable wound on said drum, a weight on the lower end of said cable, the position of said weight indicating the relative position of said strip, a limit switch, a movable stop bar for holding the strip in the welding position, movable edge guides for said strip, said switch being actuated by said weight to move said stop bar and guides toward operative position, a second limit switch actuated by said weight on continued movement thereof to stop the rotation of said roll and to move said wheel out of contact therewith when the strip has reached the welding position, manually operable means for positioning the leading edge of the trailing strip against the stop bar in welding position, a clamp for holding the strips in position to be welded, means for moving the clamp into operative position, a movable welding head, an electrode mounted on said welding head, means actuated by movement of said clamp into operative position to move the electrode into contact with said strips and supply power to the electrode, means responsive to the completion of the welding operation to open the power circuit, to return the guides and stop bar to their inoperative positions and to raise the clamp and welding head, means actuated by upward movement of the clamp to reverse the movement of the welding head, and a limit switch actuated by the welding head on reverse movement thereof to stop its movement and to rotate said rotatable roll.

GEORGE H. RENDEL.